United States Patent [19]
Suda et al.

[11] 3,764,664  
[45] Oct. 9, 1973

[54] PROCESS FOR THE PRODUCTION OF ACTIVE ANHYDROUS ALUMINUM CHLORIDE

[75] Inventors: Hideaki Suda, Takaishi; Tatsuo Kanda, Toyonaka; Yoshiro Murata; Hiromu Hida, both of Minoo; Toshio Kubo, Takarazuka, all of Japan

[73] Assignee: Sumitomo Chemical Company, Limited, Osaka, Japan

[22] Filed: June 14, 1971

[21] Appl. No.: 153,029

[30] Foreign Application Priority Data
June 19, 1970 Japan.............................. 45/53649  
Apr. 21, 1971 Japan.............................. 46/26259

[52] U.S. Cl.................. 423/495, 423/131, 260/517  
[51] Int. Cl. ............................................. C01f 7/58  
[58] Field of Search................... 423/126, 495, 135, 423/136, 496, 131; 252/364

[56] References Cited
UNITED STATES PATENTS

| | | | |
|---|---|---|---|
| 2,057,306 | 10/1936 | Martin et al. ...................... | 423/496 |
| 3,627,483 | 12/1971 | Cole et al. .......................... | 423/135 |
| 3,651,159 | 3/1972 | Long et al........................ | 423/495 X |
| 2,846,290 | 8/1958 | Yacoe................................. | 423/485 |

FOREIGN PATENTS OR APPLICATIONS

| 901,166 | 7/1962 | Great Britain...................... | 423/495 |
|---|---|---|---|

Primary Examiner—Edward Stern  
Attorney—Stevens et al.

[57] ABSTRACT

Aromatic ketocarboxylic acids represented by the formula,

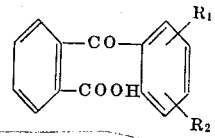

wherein $R_1$ and $R_2$ are individually hydrogen, chlorine, or a straight or branched lower alkyl or a substituted or unsubstituted cycloalkyl, are prepared by reacting phthalic anhydride with a compound represented by the formula,

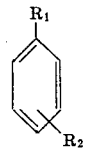

wherein $R_1$ and $R_2$ are as defined above, in the presence of a specific aluminum chloride catalyst. The specific aluminum chloride is prepared by reacting metallic aluminum with anhydrous hydrogen chloride using at least one member of trihalogenated benzenes as a solvent.

2 Claims, No Drawings

PROCESS FOR THE PRODUCTION OF ACTIVE ANHYDROUS ALUMINUM CHLORIDE

This invention relates to a process for preparing aromatic ketocarboxylic acids and more particularly to a novel process for preparing o-benzoylbenzoic acids, and to a process for preparing active anhydrous aluminum chloride.

It is well known that anthraquinone derivatives, which are very important intermediates for the production of various dyes and pigments, are prepared from o-benzoylbenzoic acids by the ring closure in the presence of a proper catalyst.

Moreover, anthraquinones produced from coal via tar have recently been decreasing year after year, so that o-benzoylbenzoic acids become more and more important as starting material for the production of anthraquinones.

It is known that o-benzoylbenzoic acids may be prepared by reacting phthalic anhydride with benzenes in the presence of aluminum chloride, which is not only expensive but also has insufficient catalytic activity when prepared by conventional processes.

The present inventors have now found that aluminum chloride prepared according to the present invention is the most active catalyst for the preparation of o-benzoylbenzoic acids.

An object of the present invention is to provide a novel process for preparing o-benzoylbenzoic acids in high yield and in high purity using the specific aluminum chloride catalyst. Another object of the present invention is to provide a novel process for preparing o-benzoylbenzoic acids in a shorter reaction time.

A further object of the present invention is to provide a process for the production of such a specific aluminum chloride.

The present invention, therefore, provides a process for the preparation of aromatic ketocarboxylic acids represented by the formula,

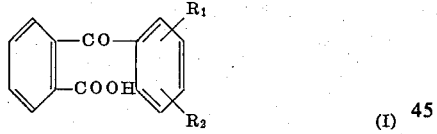

(I)

wherein $R_1$ and $R_2$ are individually hydrogen, chlorine, or a straight or branched lower alkyl such as methyl, ethyl, n-propyl, iso-propyl, n-butyl, iso-butyl, sec-butyl, t-butyl, substituted or unsubstituted cycloalkyl such as cyclohexyl and the like, which comprises reacting phthalic anhydride with a benzene derivative represented by the formula,

(II)

wherein $R_1$ and $R_2$ are as defined above, in the presence of anhydrous aluminum chloride prepared by reacting metallic aluminum with anhydrous hydrogen chloride using at least one member of trihalogenated benzenes as a solvent.

In carrying out the present process, examples of benzene derivatives represented by the formula (II) are benzene, monochlorobenzene, toluene, ethylbenzene and the like. It is advantageous to employ 2.0–20.0 moles of the compounds (II) per mole of phthalic anhydride. The preferable molar ratio depends on other reaction factors such as viscosity of the reaction system, and the like.

Temperatures between 0° and 100° C, preferably 10° to 90° C may be employed in said reaction.

As to other reaction conditions, those of conventional processes may be applied in the present reaction.

The anhydrous aluminum chloride prepared according to the present process, which is explained in more detail later, is used in an amount of 2.0 to 3.0 moles, preferably 2.1 to 2.4 moles per mole of phthalic anhydride.

As for after-treatment of the reaction product, ordinary treatments such as hydrolysis with water followed by extraction of an organic layer with an aqueous alkali solution and precipitation with acids, or steam distillation may be employed. According to the present invention the reaction products are obtained in high purity with almost quantitative yield, so that they may be used without any treatment for the subsequent steps.

As the specific anhydrous aluminum chloride is used in the present invention, the product can be obtained in such a remarkably short time as about 1/2–1/3 of that in conventional processes.

Thus, the present invention provides also a process for the production of active anhydrous aluminum chloride, which comprises reacting metallic aluminum with anhydrous hydrogen chloride using at least one member of trihalogenated benzenes as a solvent.

It is well known that anhydrous aluminum chloride is a very important industrial raw material, especially as a catalyst in the Friedel-Crafts reactions, etc.

Anhydrous aluminum chloride has been prepared mostly at high tmperatures by, i. reacting metallic aluminum with gaseous chlorine, or ii. reacting metallic aluminum with gaseous hydrogen chloride. Both the (i) and (ii) processes, however, have many troubles not only in the reaction itself but in the used apparatus, because the reaction must be carried out at high temperatures and is a complete gas-solid reaction, and moreover the product sublimes and is corrosive.

It has been proposed to react metallic aluminum with hydrogen chloride in a solvent such as alkylbenzenes which can produce a complex with the formed anhydrous aluminum chloride. But the complex obtained is used for only limited reactions.

It is also proposed in U.S. Pat. No. 2,871,244 to prepare a complex of aluminum chloride in an aromatic solvent, but the complex obtained includes undesirable unknown compounds having low boiling points and resinous materials which are caused by transformation of the solvent.

The present inventors have investigated on various solvents used in the reaction between metallic aluminum and hydrogen chloride, and have found that the more active anhydrous aluminum chloride is obtained by using trihalogenated benzenes as a solvent without producing undesirable unknown compounds and resinous materials mentioned above, because of almost negligible transformation of said solvent, and of no formation of any complex to give free anhydrous aluminum chloride.

As the metallic aluminum, such forms as powders, granules, sand-like particles and small blocks are useful.

Trihalogenated benzenes such as trichlorobenzene are used in an amount of 5 to 30 times the weight of the aluminum used. The trihalogenated benzenes used in the present process include one of their isomers, and a mixture of two or more isomers. There may be used so-called industrial trichlorobenzene containing small amount of more highly chlorinated benzenes of dichlorobenzenes.

The reaction is carried out at an elevated temperature, e.g., 30°–200° C, preferably at 30°–150° C.

Addition of a minute amount of aluminum chloride to a solvent prior to the reaction is preferable.

Hydrogen chloride is supplied to the reaction system until the metallic aluminum is completely consumed, whereby highly activated anhydrous aluminum chloride is almost quantitatively obtained.

The highly activated aluminum chloride obtained disperses uniformly in the solvent without forming any complex with trihalogenated benzenes, so that it is used as a catalyst with or without ordinary after-treatment. A part or all of the recovered solvent may be used in the subsequent reaction.

The anhydrous aluminum chloride prepared by the above-mentioned methods is highly active as a catalyst not only in the preparation of o-benzoylbenzoic acids but in the ordinary alkylation, Friedel-Crafts reactions including acylation, Fries reaction, Hauben-Hoesch reaction and other condensation reactions.

Thus, the highly activated aluminum chloride can be prepared at a lower cost than any other known processes; therefore, the process of the present invention is extremely useful and economical for an industrial production.

The following examples will serve further to illustrate the present invention. It is needless to say that the present invention is not limited thereto. In these Examples, all percentages and parts are given by weight unless otherwise specified.

Example 1 — The preparation of Catalyst A

Into a mixture of 100 parts of industrial trichlorobenzene, 10 parts of aluminum powder (100 mesh) and a minute amount of aluminum chloride kept at 100° C was introduced hydrogen chloride gas with stirring. After 6 hours, the aluminum was consumed completely, whereby aluminum chloride was obtained in the form of a uniform dispersion in the trichlorobenzene.

Yield of aluminum chloride—over 98%
Absorption ratio of hydrogen chloride—over 97%

Example 2 — The preparation of Catalyst B

After mixing 28 parts of 1,2,4-trichlorobenzene with 1 part of aluminum powder and a minute amount of aluminum chloride at 150° C, hydrogen chloride was introduced into the mixture. The reaction proceeded exothermically and was completed almost quantitatively with regard to the hydrogen chloride. A slightly yellowish dispersion of aluminum chloride was obtained. The dispersion was filtered rapidly and the resultant crystals were washed with anhydrous benzene and dried.

The analytical values of the product were as follows:
Aluminum — 20.0% (Calculated value 20.2%)
Chlorine — 80.4% (Calculated value 79.8%)

Example 3 — The preparation of Catalyst C

After mixing 200 parts of industrial trichlorobenzene containing less than 0.1% of water, with 11 parts of sand-like aluminum and a minute amount of aluminum chloride at 75° C, hydrogen chloride gas was introduced into the mixture. After the reaction was completed, the obtained crystals were filtered at 20° C and washed with anhydrous benzene and dried. The yield was 98.6%.

The analytical values of the product were as follows:
Aluminum — 20.8%
Chlorine — 79.1%

Example 4

To a mixture of 7.0 moles of benzene and 2.10 moles (as aluminum) of the dispersion of Catalyst A was added 1.0 mole of phthalic anhydride in 1 hour at 30° C. Aftr being maintained at that temperature for 1 hour, the mixture was heated at 70° C for 2 hours.

The reaction mixture was poured into an aqueous diluted hydrochloric acid solution, and the organic layer was separated under heating, and then steam-distilled. The thus obtained residual crystal was filtered off and dried.

o-Benzoylbenzoic acid was obtained with a 97.8% purity in a 96% yield.

When conventional aluminum chloride was used, 2.20 moles (as aluminum) of aluminum chloride was required and 5 hours' heating at 70° C was needed to obtain the same result.

Example 5

The same procedure as in Example 4 was repeated except that the aluminum chloride suspension was replaced by aluminum chloride obtained by filtering said suspension under nitrogen stream and washing with benzene, to obtain the same result. Since the reaction product after hydrolysis consisted solely of the desired product and benzene, o-benzoylbenzoic acid was obtained by simply separating the benzene therefrom by distillation.

Example 6

To a mixture of 5.0 moles of monochlorobenzene and 2.10 moles (as aluminum) of the dispersion of Catalyst A, was added 1.0 mole of phthalic anhydride in 1 hour at 30° C. After being maintained at that temperature for 1 hour, the mixture was heated at 80°–85° C for 3 hours.

The resulting mixture was treated as in Example 1 to obtain 4'-chloro-o-benzoylbenzoic acid in a 93% yield.

When conventional aluminum chloride was used, 5 hours' heating at 80°–85° C was needed to obtain the same result.

Example 7

To 2.3 moles (as aluminum) of a dispersion of Catalyst A was added 1.0 mole of phthalic anhydride and the resulting mixture was stirred at 10° C. After adding 4.0 moles of ethylbenzene dropwise below 10° C, the resultant mixture was maintained at that temperature for 2 hours and then heated at 40° C for 1 hour.

After-treated according to an ordinary process, was obtained 4'-ethyl-o-benzoylbenzoic acid, having a melting point of 120°–121° C in a 85% yield.

Other mono- or dialkyl substituted o-benzoylbenzoic acids were obtained by a similar procedure to the above in high purity and high yield.

What is claimed is:

1. A process for the production of active anhydrous aluminum chloride, which comprises reacting metallic aluminum with anhydrous hydrogen chloride using at least one member of trichlorobenzenes as a solvent in an amount of five to 30 times the weight of the aluminum used at a temperature of from 30° to 200° C.

2. A process according to claim 1, wherein the reaction is startd in the presence of a minute amount of aluminum chloride.

* * * * *